US012766953B2

(12) United States Patent
Kumle et al.

(10) Patent No.: US 12,766,953 B2
(45) Date of Patent: Oct. 20, 2026

(54) ACCELERATION CONTROL DEVICE HAPTIC FEEDBACK CONTROL

(71) Applicant: GM GLOBAL TECHNOLOGY OPERATIONS LLC, Detroit, MI (US)

(72) Inventors: Christopher E. Kumle, Warren, MI (US); Thomas R. Brown, Shelby Township, MI (US); Nilesh D. Mankame, Ann Arbor, MI (US); Daniel W. Booth, Bloomfield Hills, MI (US); Christopher A. Archer, Lake Orion, MI (US); Frank C. Valeri, Novi, MI (US); Eric Bradshaw, Novi, MI (US); Nathan Thompson, Sterling Heights, MI (US); Stephanie M. Brigstock, Palm Beach Gardens, FL (US)

(73) Assignee: GM Global Technology Operations LLC, Detroit, MI (US)

( * ) Notice: Subject to any disclaimer, the term of this patent is extended or adjusted under 35 U.S.C. 154(b) by 54 days.

(21) Appl. No.: 18/968,340

(22) Filed: Dec. 4, 2024

(65) Prior Publication Data

US 2026/0152060 A1 Jun. 4, 2026

(51) Int. Cl.
*B60K 26/02* (2006.01)
*B60W 50/16* (2020.01)

(52) U.S. Cl.
CPC ........... *B60K 26/021* (2013.01); *B60W 50/16* (2013.01); *B60K 2026/022* (2013.01); *B60W 2540/106* (2013.01)

(58) Field of Classification Search
None
See application file for complete search history.

(56) References Cited

U.S. PATENT DOCUMENTS 12,122,232 B2 10/2024 Tatebe et al.
2012/0191312 A1* 7/2012 Kimura ................ B60K 26/021 701/70
2015/0127234 A1* 5/2015 Wagner .................. G05D 13/62 701/70
2015/0127236 A1* 5/2015 Sieber ................... B60W 50/16 701/70

* cited by examiner

*Primary Examiner* — Peter D Nolan
*Assistant Examiner* — Michael F Whalen
(74) *Attorney, Agent, or Firm* — Quinn IP Law

(57) ABSTRACT

A system for generating haptic feedback to an operator of a motor vehicle includes a powertrain for generating vehicle propulsion. The system also includes an acceleration control device having a range of travel positions for regulating powertrain torque and vehicle acceleration. The system additionally includes a vibration transducer configured to mechanically vibrate the acceleration control device. The system also includes a vehicle sensor for detecting the operator's request for generation of the powertrain torque and acceleration of the motor vehicle and an electronic controller in communication with the vehicle sensor. The controller receives the operator's request and selectively applies, via the vibration transducer, vibration to the acceleration control device in correlation with the operator's request. The controller additionally modulates characteristic(s) of the applied vibration according to vibration command parameters and associated with a change in position and/or time derivatives of the change in position of the acceleration control device.

18 Claims, 8 Drawing Sheets

ACCELERATION CONTROL DEVICE HAPTIC FEEDBACK CONTROL

INTRODUCTION

The present disclosure relates to a system and a method for controlling haptic feedback through a vehicle acceleration control device.

A modern passenger, recreation, and work vehicle, such as a passenger car, truck, tractor, etc., generally includes a powertrain having one or more powerplants, such as an internal combustion engine and electric or traction motor(s). An electric vehicle, also called an EV, uses one or more traction motors for propulsion. A hybrid electric vehicle (HEV) typically combines an internal combustion engine with some form of electric propulsion.

In a vehicle using an internal combustion engine for propulsion, powertrain sound and subtle vibrations typically enhance operator awareness and serve as indirect communication between the vehicle and its operator. Compared to internal combustion engines, electric motors produce little or no noise and vibration. As a result, an operator of an EV may lack a reference for the amount of power being requested via the vehicle's acceleration control device (such as an accelerator pedal) and generated by the vehicle powertrain.

SUMMARY

A system for generating haptic feedback to an operator of a motor vehicle includes a powertrain configured to generate torque for propulsion of the motor vehicle. The system also includes an acceleration control device having a range of travel positions configured to regulate generation of the powertrain torque and acceleration of the motor vehicle. The system additionally includes a vibration transducer mechanically connected to the acceleration control device and configured to vibrate the acceleration control device. The system also includes a vehicle sensor configured to detect a request from the operator for generation of the powertrain torque and acceleration of the motor vehicle and an electronic controller in communication with the vehicle sensor. The electronic controller is configured to receive the detected operator request and selectively apply, via the vibration transducer, vibration to the acceleration control device in correlation with the received operator request. The electronic controller is additionally configured to modulate characteristic(s) of the vibration applied to the acceleration control device according to vibration command parameters and associated with a change in position and/or time derivatives of the change in position of the acceleration control device.

The acceleration control device may be a foot-operated accelerator pedal.

The vibration command parameters may include intensity of the vibration being set to zero until a threshold position of the acceleration control device is crossed.

The vibration command parameters may include the intensity of the vibration being conditioned on a rate of change of position of the acceleration control device.

The variation in the intensity of the vibration may be set to zero until a threshold rate of change in position of the acceleration control device is exceeded.

Transitions between changes in the intensity of the vibration may be smoothed out to mitigate sudden changes in the intensity of vibration.

The vibration command parameters may include intensity of the vibration being regulated according to at least one of the following expressions: $I_1=I_0+f_1(d)$, wherein the intensity of the vibration is a function of the travel position of the acceleration control device; $I_2=I_0+f_1(d)\times f_2(\dot{d})$, wherein the intensity of the vibration is a product of a function of the travel position and a function of a first or higher order time derivative of the change in position of the acceleration control device; and $I_3=I_0+f_1(d)+f_3(\dot{d})$, wherein the intensity of the vibration is a sum of a function of the travel position and a function of a first or higher order time derivative of the change in position of the acceleration control device.

The modulated characteristic(s) of the vibration may include vibration intensity. The electronic controller may be configured to regulate the vibration transducer via pulse width modulation (PWM) of an actuation signal and thereby vary the vibration intensity while maintaining frequency of the vibration constant.

The electronic controller may be configured to receive additional input from the vehicle operator and adjust the vibration command parameters in response to the received input.

The electronic controller may be configured to receive a request for and activate a temporary or permanent opt-out from the haptic feedback generation.

A method of generating haptic feedback to an operator of a motor vehicle having a powertrain configured to generate torque for propulsion of the motor vehicle is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
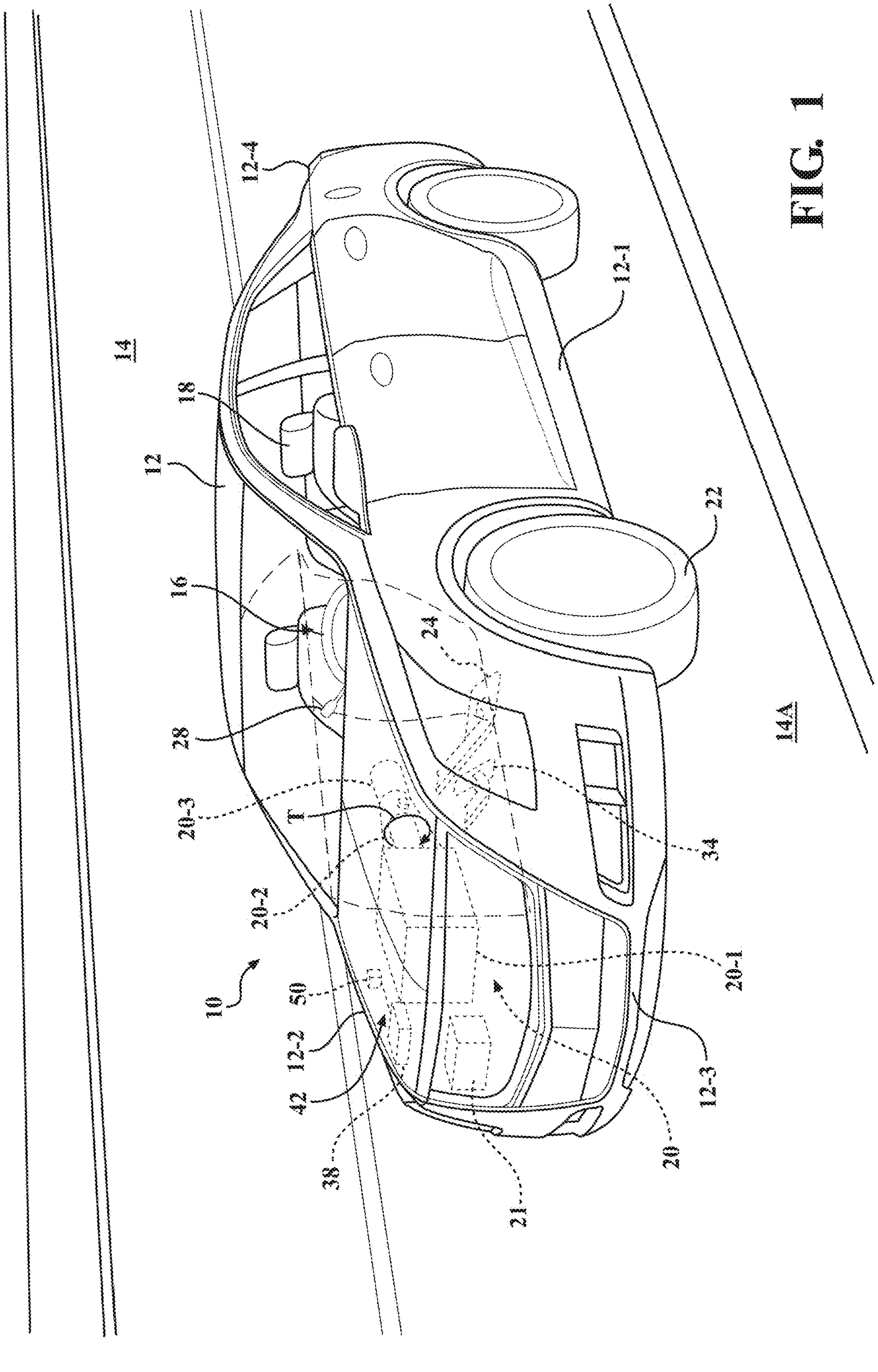
FIG. 1 is a schematic illustration of a representative motor vehicle positioned relative to a road surface, according to the disclosure.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front", "back", "fore", "aft", "left", "right", "rear", "side", "upward", "downward", "top", and "bottom", etc., describe the orientation and/or location of portions of the components or elements within a consistent but arbitrary frame of reference, which is made clear by reference to the text and the associated drawings describing the components or elements under discussion.

Furthermore, terms such as "first", "second", "third", and so on may be used to describe separate components. Such terminology may include the words specifically mentioned above, derivatives thereof, and words of similar import, and are used descriptively for the figures, and do not represent limitations on the scope of the disclosure, as defined by the appended claims. Moreover, the teachings may be described herein in terms of functional and/or logical block components and/or various processing steps. It should be realized that such block components may include a number of hardware, software, and/or firmware components configured to perform the specified functions.

Referring to the drawings, wherein like reference numbers refer to like components throughout the several views, FIG. 1 schematically depicts a vehicle 10. The vehicle 10 is generally characterized by a vehicle body 12 surrounded by an external environment 14 and positioned on a road surface 14A. The vehicle body 12 includes a left-side section 12-1, a right-side section 12-2, a front-end section 12-3, and a rear-end section 12-4. The vehicle body 12 defines a vehicle interior or passenger cabin 16 configured to accommodate a vehicle operator and passenger(s), for example in seats 18. The passenger cabin 16 may additionally accommodate various vehicle controls and auxiliary systems to be described in detail below.

The vehicle 10 also includes a powertrain 20 configured to generate vehicle propulsion. The powertrain 20 may include an internal combustion (IC) engine 20-1, electric or traction motor(s) 20-2, and/or a fuel cell (not shown) configured to generate an output torque T, and a transmission assembly 20-3, e.g., and single or multi-speed automatic transmission, to transmit powerplant torque T to at least some of the road wheels 22. The vehicle 10 may therefore be configured as plug-in electric vehicle (PEV), a hybrid electric vehicle (HEV), or be powered by another prime mover (such as an IC engine). The vehicle 10 also includes an energy storage device 21, such as an electrochemical battery or a multi-cell rechargeable energy storage system (RESS) configured to supply various systems, as well as the IC engine 20-1, electric motor(s) 20-2, and/or fuel cell with electrical power. The vehicle 10 typically also includes friction brakes (not shown) arranged at the road wheels 22 and engaged by a vehicle brake actuator 24, such as a brake pedal arranged inside the vehicle cabin 16. Furthermore, the vehicle 10 typically includes a parking brake 26, which may be configured as a lever, a pedal, or a switch (shown in FIG. 2), for retarding vehicle motion and securing the vehicle in a stationary state.

Figure 2:
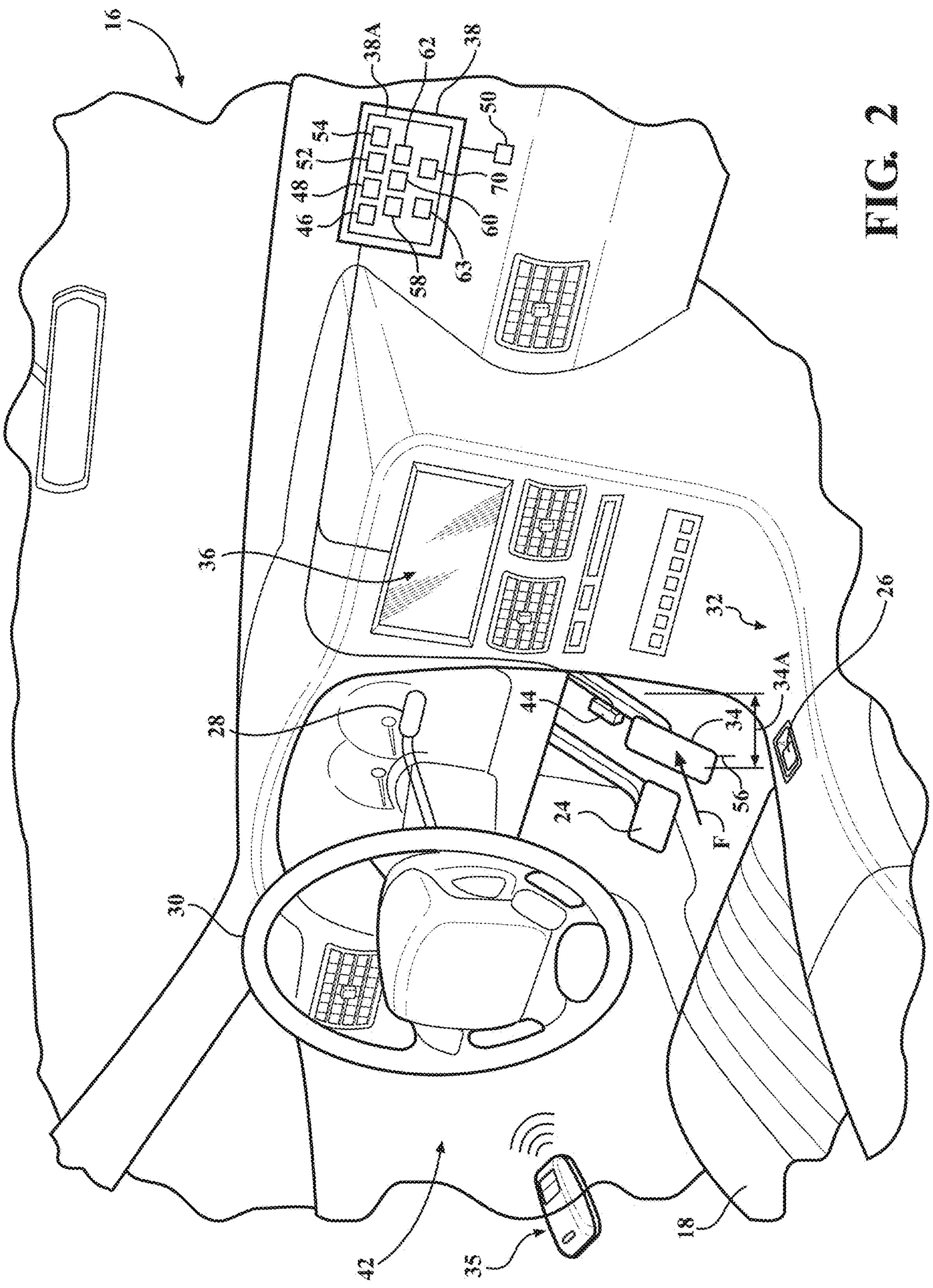
FIG. 2 is a schematic close-up view of the passenger cabin of the motor vehicle shown in FIG. 1, illustrating a system for generating haptic feedback to the vehicle's operator, according to the disclosure.

As shown in FIG. 2, the vehicle 10 additionally includes a vehicle operating mode selector 28, such as a shift lever, configured to shift the powertrain 20 between vehicle propulsion modes, e.g., drive, individual forward gear ranges, or reverse, and vehicle park configured to block the vehicle propulsion mode and maintain the vehicle in a stationary state. The vehicle operating mode selector 28 is arranged inside the vehicle cabin 16 within convenient reach of the vehicle operator, such as near a steering wheel 30 (shown in FIG. 2) or on the console 32 between the front seats 18. The vehicle 10 also includes an acceleration control device 34, such as a foot-operated accelerator pedal (shown in FIG. 2) arranged near the brake actuator 24 or a hand operated lever (not shown) arranged near the steering wheel 30. The acceleration control device 34 has a range 34A of actuation travel positions configured to regulate generation of the powertrain torque T and hence the acceleration of motor vehicle 10.

The vehicle 10 additionally includes a vehicle key 35, such as a physical key, a smart-key (shown in FIG. 2), or a fob transmitter. The vehicle key 35 is configured to permit the vehicle operator to activate the powertrain 20, as well as auxiliary vehicle systems, such as an infotainment 36 and heating, ventilation, and air conditioning (HVAC) provided with respective input interfaces. The vehicle 10 further includes an electronic controller 38 (shown in FIGS. 1 and 2). The electronic controller 38 may be a central processing unit (CPU) or a body control module (BCM) configured to receive data signals from various vehicle sensors and manage operation of vehicle systems. Specifically, the electronic controller 38 is in operative communication with the powertrain 20, the vehicle brake actuator 24, the parking brake 26, the vehicle mode selector 28, acceleration control device 34, and the vehicle key 35. The electronic controller 38 may be in operative communication with such vehicle systems and sensors via a data network, e.g., a Controller Area Network (CAN bus), arranged in the vehicle 10.

A system 42 for generating haptic feedback to an operator of the motor vehicle 10 shown in FIG. 2 and to be described in detail below, includes at least the powertrain 20, the energy storage device 21, the acceleration control device 34, and the electronic controller 38. The system 42 also includes a vibration transducer 44 mechanically connected to the acceleration control device 34. The vibration transducer 44 is configured to vibrate the acceleration control device 34 for enhancing sensory communication between the motor vehicle and the vehicle operator. The system 42 specifically generates haptic feedback from the acceleration control device 34 to the operator as the powertrain 20 generates vehicle propulsion as a function of the applied powertrain torque T and/or a time derivative of T. Haptic feedback thereby generates a reference for the amount of power being requested and applied by the vehicle powertrain via the acceleration control device 34. By activating the powertrain 20, the vehicle key 35 may also activate the system 42 for enhancing sensory communication between the vehicle and its operator.

The electronic controller 38 includes a memory 38A that is tangible and non-transitory. The memory 38A may be a recordable medium that participates in providing computer-readable data or process instructions. Such a medium may take many forms, including but not limited to non-volatile media and volatile media. Non-volatile media used by the electronic controller 38 may include, for example, optical or magnetic disks and other persistent memory. Volatile media of each of the controller's memory 38A may include, for example, dynamic random-access memory (DRAM), which may constitute a main memory. Such instructions may be transmitted by one or more transmission medium, including coaxial cables, copper wire and fiber optics, including the wires that comprise a system bus coupled to the vehicle systems.

Memory 38A of the electronic controller 38 may also include a flexible disk, hard disk, magnetic tape, other magnetic medium, a CD-ROM, DVD, other optical medium, etc. The electronic controller 38 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the electronic controller 38 or accessible thereby, generally indicated via numeral 46, may be stored in the memory 38A and automatically executed to provide the required functionality to operate the vehicle 10 in the context of the system 42. The electronic controller 38 is also configured, using appropriate algorithm(s) 46, to generate and supply a haptic feedback or actuation signal 48 to the vibration transducer 44 for regulating vibration of the acceleration control device 34, as will be described in detail below.

With continued reference to FIG. 2, the system 42 further includes a vehicle sensor 50 in communication with the electronic controller 38. The vehicle sensor 50 is configured to detect a request 52 from the operator, such as via force F application to the acceleration control device 34 and/or via a displacement d of the acceleration control device 34 and/or time derivatives of F and/or d, for generation of the powertrain torque T and acceleration of the motor vehicle 10. The electronic controller 38 is configured to receive the detected operator request 52. The electronic controller 38 is also configured to selectively apply, via the vibration transducer 44, vibration to the acceleration control device 34 in correlation with the received operator request 52. The electronic controller 38 is further configured to modulate one or more characteristics of the vibration applied to the acceleration control device 34 according to vibration command parameters 54 and associated with a change in position of the acceleration control device or a time derivative of the subject change in position. Specifically, one of the modulated characteristics may be intensity of vibration of the acceleration control device 34 being varied both according to vibration command parameters 54 and proportionally with the change in position of the acceleration control device. In other words, the vibration the control parameters 54 include a relationship between acceleration control device actuation travel (e.g., pedal position or depression) and the vibration intensity of vibration transducer 44 and is used by the electronic controller 38 to generate haptic feedback to the vehicle operator. More broadly, the intensity and/or other characteristics of the vibration signal, such as frequency and pattern, may be a function of not only the position of the acceleration control device 34, but also of a first and/or higher time derivatives of the acceleration control device position and user preferences.

Figure 3:
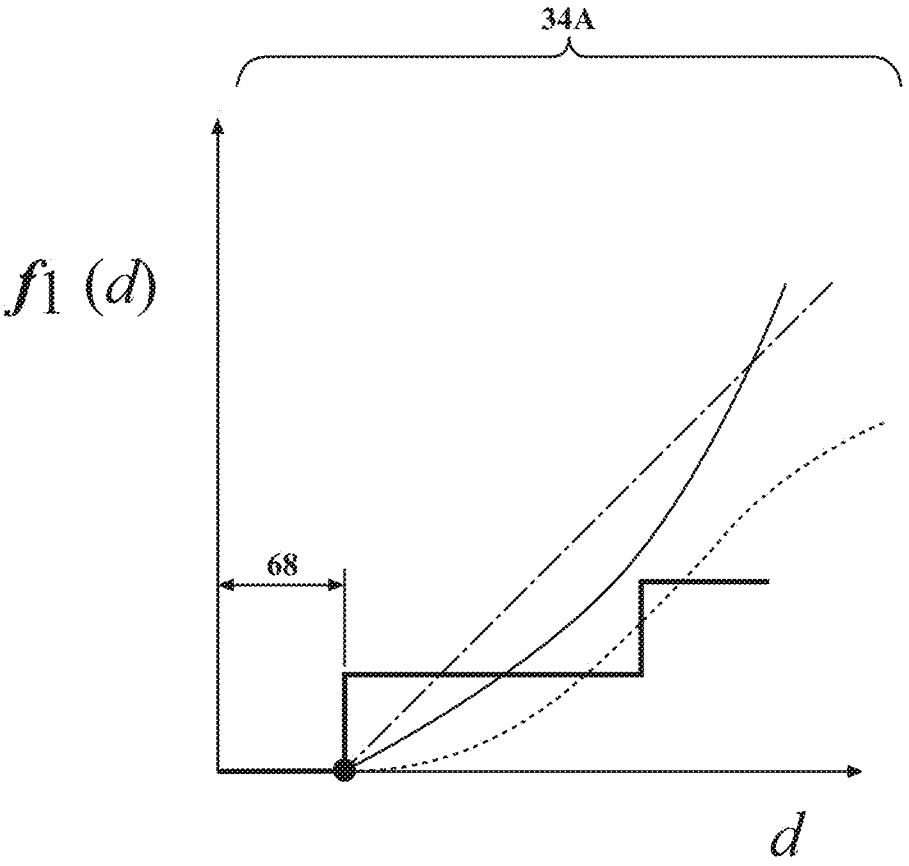
FIG. 3 is a first representative plot of various embodiments of a component of vibration intensity depicted as a function of acceleration control device actuation travel versus time being regulated using a mathematical expression, according to the disclosure.
Figure 3A:
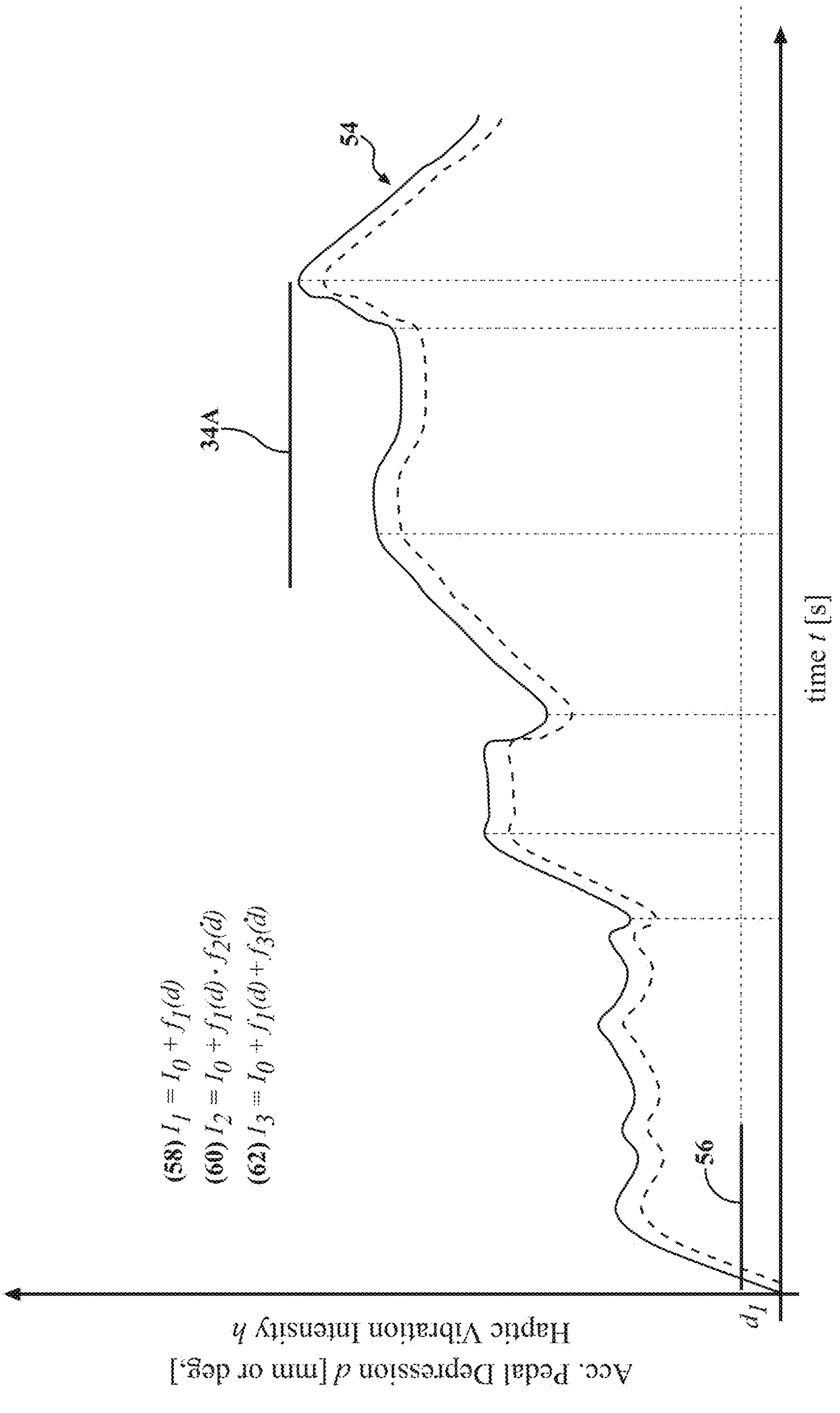
FIG. 3A is a representative plot of vibration intensity time corresponding to an embodiment of the component of vibration intensity from the plot shown in FIG. 3, illustrating vibration intensity being regulated in individual regions of the acceleration control device's actuation travel range, according to the disclosure.

The electronic controller 38 may also receive various vehicle operation parameters from other vehicle sensors, such as g-forces acting on the vehicle body 12, operation of traction control, etc., to establish or adjust the vibration command parameters. In mathematical terms, the intensity of the vibration may be regulated according to expression (58) $I_1=I_0+f_1(d)$ (shown in FIG. 3A), wherein the intensity of the vibration is a function of the travel position of the acceleration control device. Four different representative forms of the term $f_1(d)$ are graphically depicted in FIG. 3 using different line types. Specifically, in the expression 58, the term $I_0$ represents the baseline intensity of vibration generated at the acceleration control device 34, while the term $f_1(d)$ represents a selected function of device's actuation travel across its actuation range 34A. FIG. 3A depicts a first representative plot of vibration intensity as a function of time defined by the expression 58 when $f_1$ has the form shown using a dash-dot (or chain) line type in FIG. 3.

Figure 5:
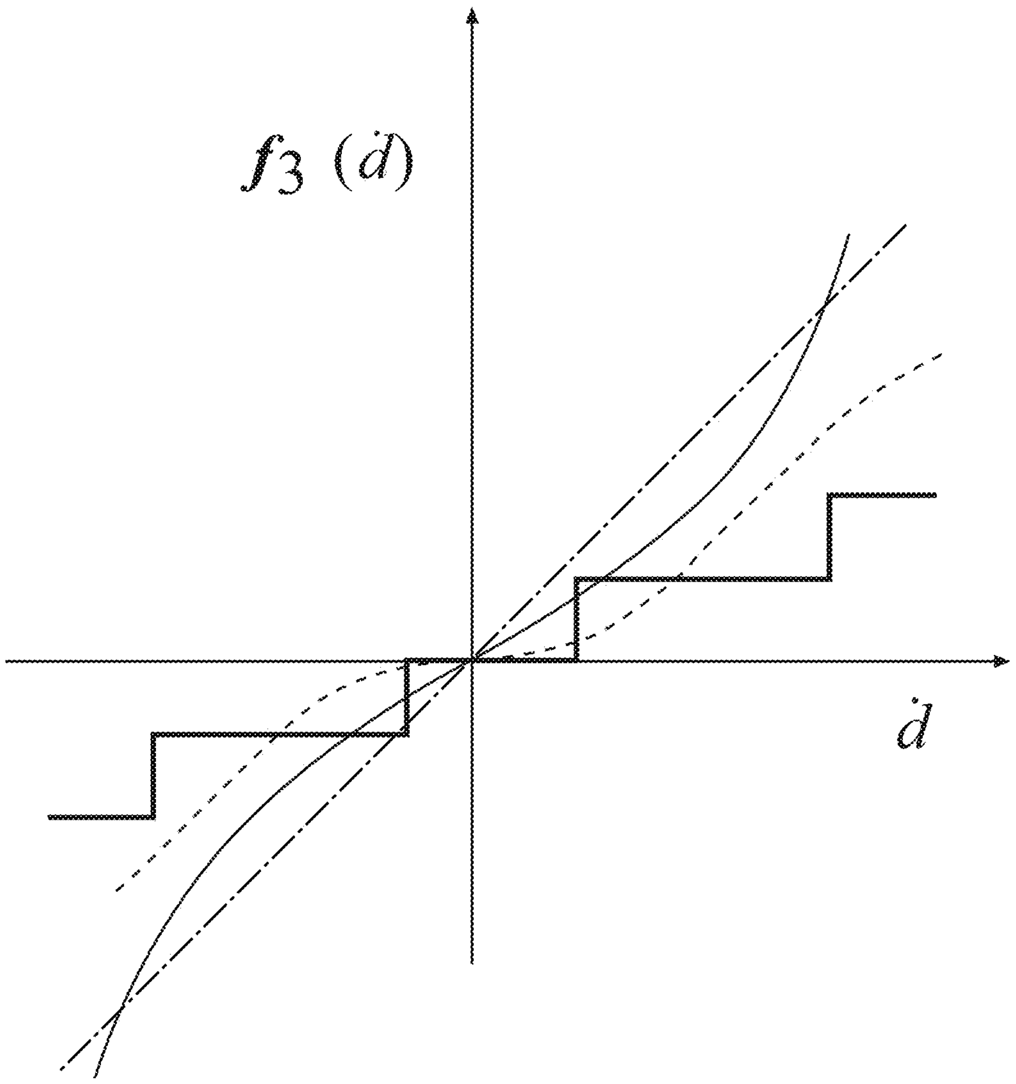
FIG. 5 is a third representative plot of various embodiments of a component of vibration intensity depicted as a function of a derivative of acceleration control device actuation travel versus time being regulated using a mathematical expression, according to the disclosure.
Figure 5A:
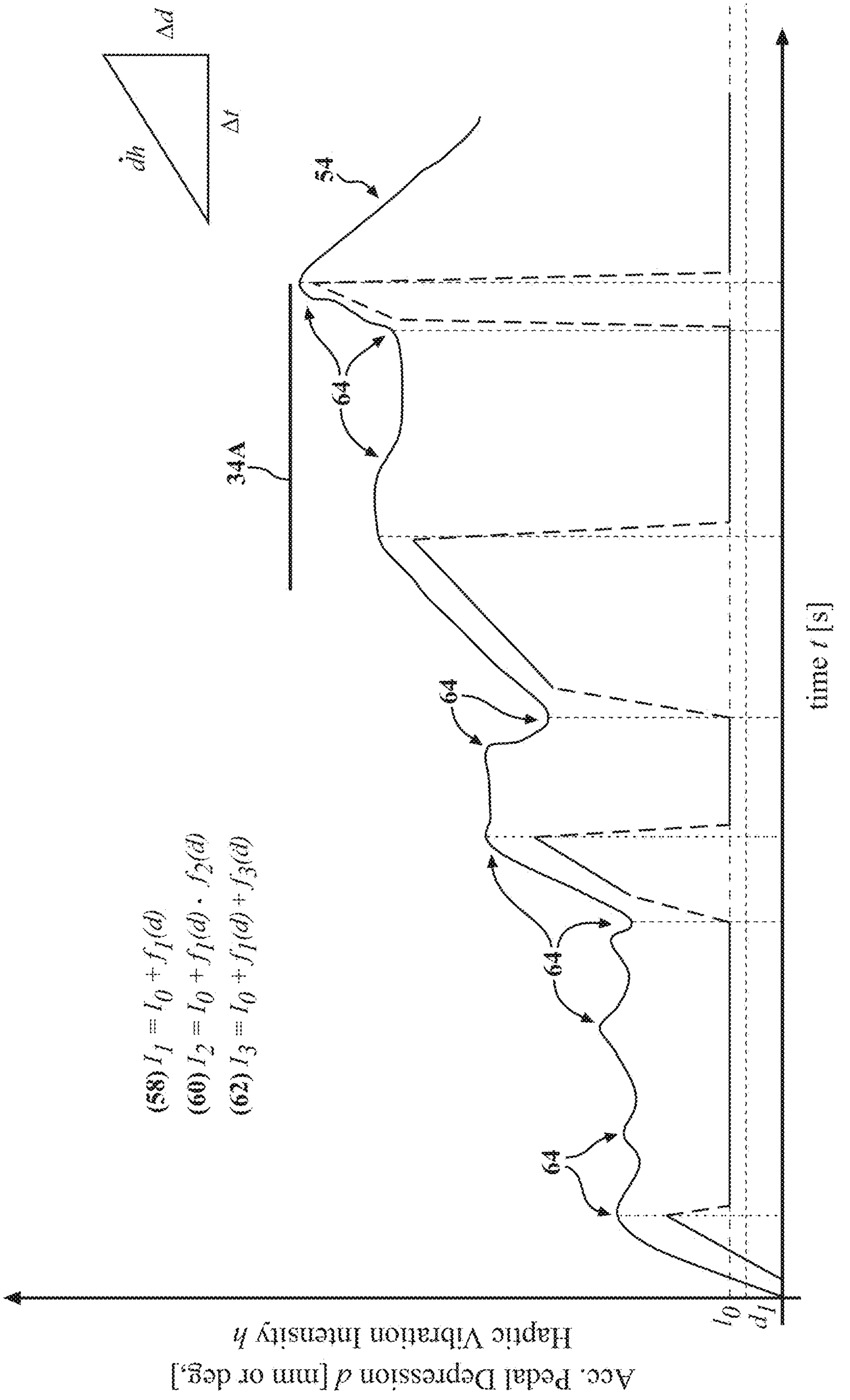
FIG. 5A is a representative plot of vibration intensity versus time corresponding to an embodiment of the component of vibration intensity from the plot shown in FIG. 5, illustrating vibration intensity being regulated in individual regions of the acceleration control device's actuation travel range, according to the disclosure.

The vibration command parameters 54 shown in FIG. 5A may have the intensity of the vibration being conditioned on the rate of actuation of the acceleration control device 34, as well as the position of the subject accelerator control device. As shown in FIG. 3A, the vibration command parameters 54 may include intensity of the vibration being set to zero, via the algorithm(s) 46, until a threshold position 56 of the acceleration control device 34 is crossed. The threshold position 56 of the acceleration control device 34 may be set a relatively short amount of travel from the initial at rest position of the device along its actuation travel range 34A. The setting of threshold position 56 may accordingly create an initial dead zone in the acceleration control device's travel range 34A, for example, to simulate a common user experience with vehicles using internal combustion engines.

Figure 4:
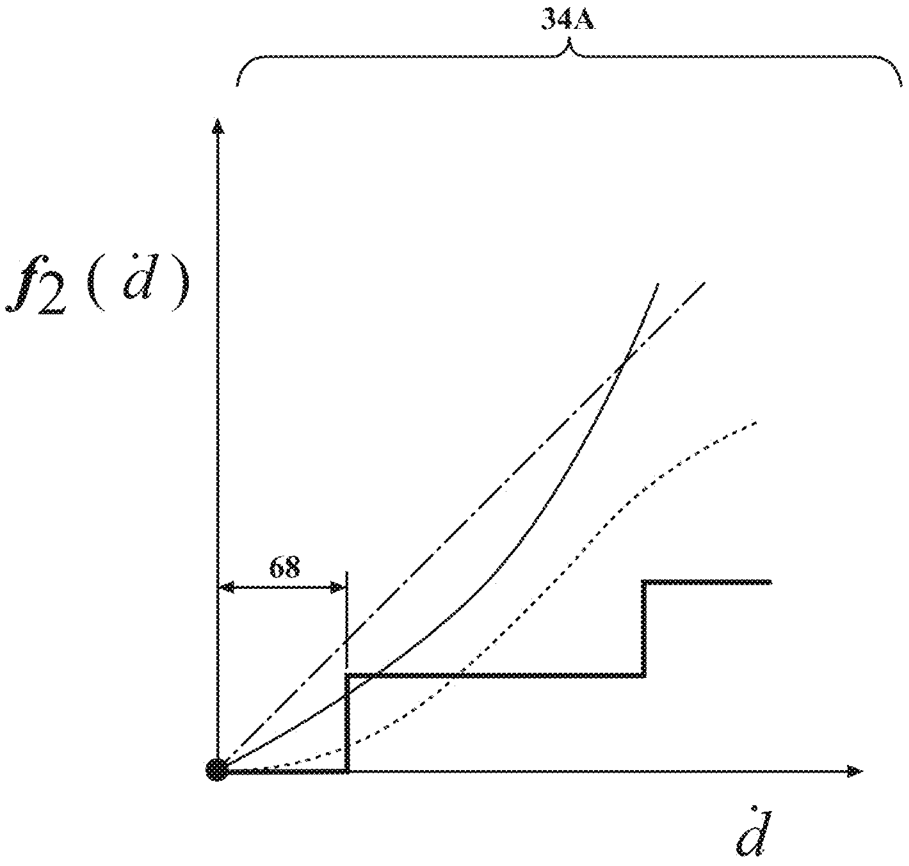
FIG. 4 is a second representative plot of various embodiments of a component of vibration intensity depicted as a function of a derivative of acceleration control device actuation travel versus time being regulated using a mathematical expression, according to the disclosure.

Alternatively, the intensity of the vibration may be regulated according to expression (60) $I_2=I_0+f_1(d)\times f_2(\dot{d})$ (shown in FIG. 5A), wherein the second component of the intensity of vibration is a product of a function of the travel position and a function of a first or higher order time derivative of the change in position of the acceleration control device. Specifically, in the expression 60, the term $f_2(\dot{d})$ represents a particular function of a rate of change (time derivative) of position of the acceleration control device 34. FIG. 4 shows four different representative forms of $f_2$ using different line types. In another alternative, the intensity of the vibration may be regulated according to expression (62) $I_3=I_0+f_1(d)+f_3(\dot{d})$ (shown in FIG. 5A) wherein the intensity of vibration is a sum of a baseline value, a function of the travel position, and a function of a first or higher order time derivative of the change in position of the acceleration control device. Specifically, in the expression 62, the term $f_3(\dot{d})$ represents an alternative function of the rate of change of position of the acceleration control device 34. FIG. 5 shows four different representative forms of $f_3$ using different line types.

FIG. 5A depicts a second representative plot of vibration intensity as a function of acceleration control device 34 actuation versus time defined by the expression 62. The second representative plot of FIG. 5A corresponds to $f_1$ assuming the form shown using the dash-dot (chain) line type in FIG. 3 and $f_3$ assuming the form shown using dash-dot line type in FIG. 5. Similar to FIG. 3A, in the plot depicted in FIG. 5A the vibration command parameters 54 may include the intensity of the vibration being conditioned on the rate of actuation of the acceleration control device 34 and the position of the subject accelerator control device. In the expression 62, the variation in the intensity of the vibration may be set to zero until the rate of change in position ($\dot{d}$) of the acceleration control device 34 exceeds a threshold magnitude or rate 63. In other words, the vibration control parameters 54 may additionally include a relationship between acceleration control device 34 actuation rate (rate of change of position and higher order time derivatives) and vibration intensity of the vibration transducer 44 to generate haptic feedback. Each of the mathematical expressions 58, 60, and 62 may be programmed into the electronic controller 38 for operating the system 42.

With reference to the expressions 58, 60, 62, transitions 64 (shown in FIG. 5A) between changes in the intensity of the vibration applied to the acceleration control device 34 may be smoothed out, via particular programming of the algorithm(s) 46. Such smoothing of the transitions 64 may be used to mitigate sudden changes in the intensity of vibration and a possible similar effect on the actuation of the acceleration control device 34 and the resultant powertrain torque T. With reference to FIGS. 3 and 4, the vibration command parameters may also include the intensity of the vibration being separately regulated in individual regions of the range 34A of acceleration control device's actuation travel. As an example of a step-wise continuous variation of vibration intensity per the expression 58, $I_1$ is shown in FIG. 3 using a solid line type, wherein each step corresponds to a particular interval of acceleration control device 34 travel. A small offset 68 (shown in FIGS. 3 and 4) during which vibration input from the vibration transducer 44 is a nominal value, may be added to the initial part of the actuation travel range 34A.

The electronic controller 38 may be configured to regulate the vibration transducer 44 via pulse width modulation (PWM) of the haptic feedback signal 48 and thereby vary the vibration intensity while maintaining frequency of the pulses and the vibration constant. The algorithm(s) 46 may be pre-programmed with the expressions 58, 60 and the numerical values for the vibration command parameters. Optionally, the electronic controller 34 may be configured to receive additional input from the vehicle operator, for example via the infotainment system 36, and use the received input for selecting the vibration command parameters 54. For example, the electronic controller 34 may adjust the vibration command parameters 54 (i.e., regulating vibration intensity, etc.) in response to the vehicle operator selecting vehicle sport versus comfort driving mode. The electronic controller 38 may be configured to receive from the vehicle operator a request for and activate a temporary, e.g., one key-cycle or until the request is reversed, opt-out 70 from the haptic feedback generation.

Figure 6:
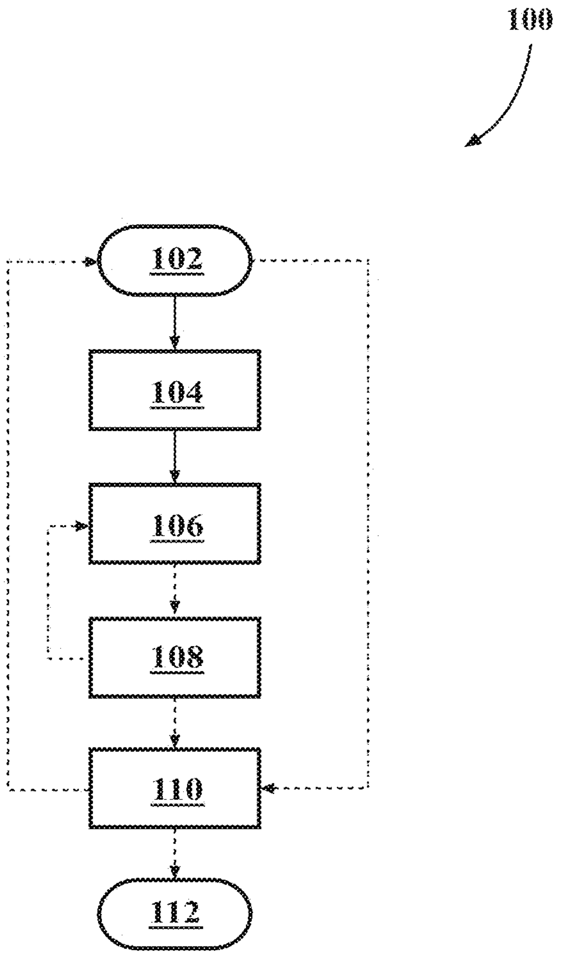
FIG. 6 is a flow diagram of a method of generating haptic feedback to an operator of the motor vehicle shown in FIGS. 1-5A, according to the disclosure.

FIG. 6 depicts a method 100 of generating haptic feedback to an operator of a motor vehicle, such as the vehicle 10, via the system 42, as described above with respect to FIGS. 1-5A. The method 100 is configured to facilitate generation of a tactile reference for the amount of power being requested and applied by the vehicle powertrain 20 via the acceleration control device 34. The method 100 initiates in frame 102, where the method includes identifying a selection activating, via the electronic controller 34, the haptic feedback generation as described above, or receiving an opt-out 70 from the haptic feedback generation and activating the requested opt-out. Following frame 102, the method may advance to frame 104 if the haptic feedback was activated or proceed directly to frame 110 if the operator selected the opt-out 70.

In frame 104, the method includes receiving, via the electronic controller 38, a signal indicative of the powertrain 20 being enabled, such as by the vehicle key 35 and/or the vehicle operating mode selector 28. Following frame 104, the method proceeds to frame 106. In frame 106, the method includes detecting, via the electronic controller 38, the vehicle operator request 52, such as via force F application to the acceleration control device 34 and/or displacement d thereof, for generation of the powertrain torque T and acceleration of the motor vehicle 10. After frame 106, the method advances to frame 108. In frame 108, the method includes selectively applying, via the electronic controller 34 using the vibration transducer 44, vibration to the acceleration control device 34 in correlation with the received operator request 52.

In frame 108, the method further includes modulating, via the electronic controller 38, one or more characteristics (such as intensity, frequency, and/or pattern) of the vibration applied to the acceleration control device 34. Modulating the characteristic(s) of the applied vibration is accomplished according to vibration command parameters 54 (preprogrammed into the controller 38 and/or entered by the vehicle operator) and associated with the change in position, as well as first and higher order time derivatives of position, of the acceleration control device 34. As described with respect to FIGS. 1-5A, varying of the intensity of the vibration at the acceleration control device 34 may be accomplished via PWM of the haptic feedback signal 48 to the vibration transducer 44 while maintaining frequency of the vibration constant. Frames 106 and 108 may form a haptic feedback modulation loop while power is being requested and applied by the vehicle powertrain 20 via the acceleration control device 34.

As also described above with respect to FIGS. 1-5A, the vibration command parameters 54 may include intensity of the vibration being set to zero until a threshold position of the acceleration control device 34 is crossed. The vibration command parameters 54 may also include the intensity of the vibration being conditioned on a rate of change of position of the acceleration control device 34. The variation in the intensity of the vibration may be set to zero until the threshold rate 63 of change in position of the acceleration control device 34 is exceeded. The transitions 64 between changes in the intensity of the vibration applied to the acceleration control device 34 may be smoothed out to mitigate sudden changes in the intensity of vibration. The vibration command parameters 54 may include intensity of the vibration being regulated according to at least one of the expression (58) $I_1=I_0+f_1(d)$, expression (60) $I_2=I_0+f_1(d)\times f_2(\dot{d})$, and (62) $I_3=I_0+f_1(d)+f_3(\dot{d})$, as described with respect to FIGS. 3-5A.

Following frame 108, the method may advance to frame 110 for powertrain 20 shut-off or general vehicle system deactivation. Once the vehicle operator has selected the vehicle park mode via the vehicle operating mode selector 28, the parking brake 26 has been engaged, the powertrain 20 torque generation has been shut off, and/or the vehicle 10 has been exited by the operator with the vehicle key 35, the method 100 may return to frame 102 or conclude in frame 112. Overall, method 100 enhances sensory communication between the vehicle and its operator. Specifically, the method permits generation of haptic feedback to an operator of a motor vehicle providing a reference for the amount of power being requested by the operator and applied by the vehicle powertrain.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for generating haptic feedback to an operator of a motor vehicle, the system comprising:

a powertrain configured to generate torque for propulsion of the motor vehicle;

an acceleration control device having a range of travel positions configured to regulate generation of the powertrain torque and thereby producing acceleration of the motor vehicle;

a vibration transducer mechanically connected to the acceleration control device and configured to vibrate the acceleration control device;

a vehicle sensor configured to detect a request from the operator for generation of the powertrain torque and acceleration of the motor vehicle; and an electronic controller in communication with the vehicle sensor and configured to:

receive the detected operator request; and selectively apply, via the vibration transducer, vibration to the acceleration control device in correlation with the received operator request;

wherein selective application of the vibration includes modulating one or more characteristics of the vibration applied to the acceleration control device according to vibration command parameters and associated with a change in position and/or time derivatives of the change in position of the acceleration control device; and wherein the vibration command parameters include intensity of the vibration being conditioned on a first and/or higher time derivatives of the position of the acceleration control device.

2. The system for generating haptic feedback according to claim 1, wherein the acceleration control device is a foot-operated accelerator pedal.

3. The system for generating haptic feedback according to claim 1, wherein the vibration command parameters include intensity of the vibration being set to zero until a threshold position of the acceleration control device is crossed.

4. The system for generating haptic feedback according to claim 1, wherein variation in the intensity of the vibration is set to zero until a threshold rate of change in position of the acceleration control device is exceeded.

5. The system for generating haptic feedback according to claim 1, wherein transitions between changes in the intensity of the vibration are smoothed out to mitigate sudden changes in the intensity of vibration.

6. The system for generating haptic feedback according to claim 1, wherein the vibration command parameters include intensity of the vibration being regulated according to at least one of the following expressions:

$I_1=I_0+f_1(d)$, wherein the intensity of the vibration is a function of the travel position of the acceleration control device;

$I_2=I_0+f_1(d)\times f_2(\dot{d})$, wherein the intensity of the vibration is a product of a function of the travel position and a function of a first or higher order time derivative of the change in position of the acceleration control device; and $I_3=I_0+f_1(d)+f_3(\dot{d})$, wherein the intensity of the vibration is a sum of a function of the travel position and a function of a first or higher order time derivative of the change in position of the acceleration control device.

7. The system for generating haptic feedback according to claim 1, wherein one or more characteristics of the vibration includes vibration intensity, and wherein the electronic controller is configured to regulate the vibration transducer via pulse width modulation (PWM) of an actuation signal and thereby vary the vibration intensity while maintaining frequency of the vibration constant.

8. The system for generating haptic feedback according to claim 1, wherein the electronic controller is configured to receive additional input from the vehicle operator and adjust the vibration command parameters in response to the received input.

9. The system for generating haptic feedback according to claim 1, wherein the electronic controller is configured to receive a request for and activate an opt-out from the haptic feedback generation.

10. A method of generating haptic feedback to an operator of a motor vehicle having a powertrain configured to generate torque for propulsion of the motor vehicle, the method comprising:

receiving, via an electronic controller from a vehicle sensor, a motor vehicle operator request for generation of the powertrain torque and acceleration of the motor vehicle; and selectively applying, via the electronic controller using a vibration transducer mechanically connected to an acceleration control device having a range of travel positions, vibration to the acceleration control device in correlation with the received operator request;

wherein selectively applying the vibration includes modulating, via the electronic controller, one or more characteristics of the vibration applied to the acceleration control device according to vibration command parameters and associated with a change in position and/or time derivatives of the change in position of the acceleration control device; and wherein the vibration command parameters include intensity of the vibration being conditioned on a first and/or higher time derivatives of the position of the acceleration control device.

11. The method of generating haptic feedback according to claim 10, wherein the acceleration control device is a foot-operated accelerator pedal.

12. The method of generating haptic feedback according to claim 10, wherein the vibration command parameters include intensity of the vibration being set to zero until a threshold position of the acceleration control device is crossed.

13. The method of generating haptic feedback according to claim 10, wherein variation in the intensity of the vibration is set to zero until a threshold rate of change in position of the acceleration control device is exceeded.

14. The method of generating haptic feedback according to claim 10, wherein transitions between changes in the intensity of the vibration are smoothed out to mitigate sudden changes in the intensity of vibration.

15. The method of generating haptic feedback according to claim 10, wherein the vibration command parameters include intensity of the vibration being regulated according to at least one of the following expressions:

$I_1=I_0+f_1(d)$, wherein the intensity of the vibration is a function of the travel position of the acceleration control device;

$I_2=I_0+f_1(d)\times f_2(\dot{d})$, wherein the intensity of the vibration is a product of a function of the travel position and a function of a first or higher order time derivative of the change in position of the acceleration control device; and $I_3=I_0+f_1(d)+f_3(\dot{d})$, wherein the intensity of the vibration is a sum of a function of the travel position and a function of a first or higher order time derivative of the change in position of the acceleration control device.

16. The method of generating haptic feedback according to claim 10, wherein modulating one or more characteristics of the vibration includes varying vibration intensity, and wherein varying intensity of the vibration is accomplished via pulse width modulation (PWM) of an actuation signal to the vibration transducer while maintaining frequency of the vibration constant.

17. The method of generating haptic feedback according to claim 10, further comprising:

receiving, via the electronic controller, additional input from the vehicle operator and adjusting the vibration command parameters in response to the received input; and receiving a request for and activating, via the electronic controller, an opt-out from the haptic feedback generation.

18. A system for generating haptic feedback to an operator of a motor vehicle, the system comprising:

a powertrain configured to generate torque for propulsion of the motor vehicle;

a foot-operated accelerator pedal having a range of travel positions configured to regulate generation of the powertrain torque and acceleration of the motor vehicle;

a vibration transducer mechanically connected to the accelerator pedal and configured to vibrate the accelerator pedal;

a vehicle sensor configured to detect a request from the operator for generation of the powertrain torque and acceleration of the motor vehicle; and an electronic controller in communication with the vehicle sensor and configured to:

receive the detected operator request; and selectively apply, via the vibration transducer, vibration to the accelerator pedal in correlation with the received operator request;

wherein selective application of the vibration includes varying intensity of the vibration of the accelerator pedal according to vibration command parameters and associated with a change in position and/or time derivatives of the change in position of the accelerator pedal; and wherein the electronic controller is configured to regulate the vibration transducer via pulse width modulation (PWM) of an actuation signal and thereby vary the vibration intensity while maintaining frequency of the vibration constant.

* * * * *